Patented Sept. 21, 1937

2,093,434

UNITED STATES PATENT OFFICE 2,093,434

MANUFACTURE OF HYDRATION PRODUCTS OF OLEFINES

Walter Henry Groombridge and Reginald John Peek, Spondon, near Derby, England, assignors to Celanese Corporation of America, a corporation of Delaware No Drawing. Application October 23, 1934, Serial No. 749,614. In Great Britain November 20, 1933

7 Claims. (Cl. 260—156)

This invention relates to the manufacture of alcohols and ethers.

Alcohols and ethers may be made by absorbing olefines in strong acids, especially in sulphuric acid, and subsequently hydrolyzing the absorption products with more or less water according as it is desired to produce an alcohol or an ether. It is found, however, that the absorption and hydrolysis steps usually require the presence of acids of different concentration, and it is therefore necessary to dilute the acid after the absorption step and before the hydrolysis. In consequence, if the acid after the hydrolysis is to be employed for the absorption of further quantities of olefine, it must first be reconcentrated.

We have found that this disadvantage may to a certain extent be overcome and a relatively concentrated acid recovered if the acid liquor resulting from the absorption of an olefine in a strong acid is diluted and heated to distil off alcohol and/or ether under conditions such that the concentration of water in the liquor is locally stabilized at a relatively high level.

According to the invention therefore the acid liquor resulting from the absorption is passed through a zone of increasing temperature wherein hydrolysis takes place, the voltaile hydrolysis products being removed from the zone by distillation. The water required for the hydrolysis may be added to the liquor before or after or simultaneously with the entrance of the liquor into the zone.

Advantageously a considerable proportion of the vapours leaving the hydrolysis zone may be condensed and returned to the zone, either at or near the point of entry of the acid liquor into the zone, or at a point in the zone at which the temperature is lower than at the said point of entry.

In carrying the invention into effect the absorption liquor, already diluted with water if desired, may be introduced into a column, tower or the like heated at its lower end, the acid liquor inlet or inlets being at the upper end of the column or at a point or points substantially above the lower end thereof; the volatile products of the hydrolysis may be removed by distillation from the upper end of the column, while the acid, with any unhydrolyzed absorption product which may remain, may be withdrawn from the heated lower end thereof. If the acid liquor is not diluted before its entrance into the column, tower or the like, the water required may be introduced at or near the acid liquor inlet. The column may be provided with a dephlegmator by means of which a considerable proportion of the vapours are condensed and returned to the upper end of the column or, when the acid liquor inlet is lower down, at or near the inlet or between the inlet and the upper end of the column. When the acid liquor is introduced at a point between the two ends of the column the length of column above the inlet may serve to effect at least a partial separation between water and the volatile hydrolysis products and thereby to assist in maintaining a high local concentration of water in the acid liquor near to the inlet. The column above and/or below the acid liquor inlet may contain a series of plates or other type of filling such as, for example, Raschig rings or pumice or the like.

The dephlegmator referred to above, which may comprise a single condenser or a number of condensers, may be adjusted so that, for instance, a proportion of the order of 80% of the vapour leaving the column is condensed and returned to the column. Not only does this increase the local concentration of water near the acid liquor inlet, thus aiding the hydrolysis, but it also facilitates control of the process and makes the efficient use of the whole length of the column a matter of simple adjustment. Advantageously the temperature at the lower end of the column, the dilution and rate of flow of the acid liquors, and the proportion of the vapours condensed and returned to the column may be such that the hydrolysis occurs mainly or wholly in the neighbourhood of the acid liquor inlet, so that, while any part of the column above the inlet serves to some extent to effect fractionation of the vapours, throughout the remainder of the column the regenerated acid becomes progressively more concentrated.

A valuable feature of the invention is that it provides a process in which the hydrolysis of the absorption products is effected without the necessity of so considerable a dilution of the acid liquors as has commonly been the practice heretofore, and in which the relatively concentrated acid thus obtained after the hydrolysis is still further concentrated continuously with the hydrolysis.

The following description of a manufacture of isopropyl alcohol will serve as an example of one method whereby the invention may be carried into effect. An acid liquor comprising isopropyl sulphuric acid obtained by the absorption of approximately one molecular proportion of propylene in sulphuric acid of concentration between 85% and 90%, is diluted with, for example, between its own weight and half this amount of water. The diluted liquor may be fed into the upper end of a column, which may contain plates or the like or which may be packed with pumice or other filling material, and which is heated at its lower end.

The temperature conditions maintained in the column and the rate of flow of the diluted liquor may be adjusted so that the greater part of the isopropyl sulphuric acid is hydrolyzed in the upper part of the column, a mixture of the vapours of isopropyl alcohol and water leaving the top of the column. The vapours may be led into the first of two condensers, in which they are for the most part condensed, and the condensate returned to the top of the column; the vapours leaving this first condenser may then be condensed in the second.

Sulphuric acid originally present in the liquor, together with that produced by the hydrolysis, flows down the column and during its passage to the base thereof it is subjected to a steadily rising temperature due to the heat applied to the lower end of the column. The result of this rising temperature is to effect a progressive vaporization of the water contained in the acid, and therefore a progressive concentration of the acid.

The process of the invention may be made the basis of a continuous conversion of olefines, especially ethylene and propylene, into the corresponding alcohols or ethers. In such a method of working the acid may be employed in the following cycle:—absorption; dilution; combined hydrolysis and re-concentration; a further re-concentration step if necessary; absorption. In a modification of this procedure partially re-concentrated acid obtained according to the invention may be employed in the absorption of higher or more reactive olefines, or for the removal of higher unsaturated compounds from a gas before treating it for the absorption of lower olefines such as butylene, propylene, or ethylene, or in any other way. If desired the acid may be used in three or more process steps which may each require acid of lower concentration that the last.

Liquors produced by the absorption of more than one olefine in sulphuric acid may also be treated by the process of the invention, and in such cases the second of the condensers mentioned above may, if desired, effect or assist in effecting the separation of the various reaction products.

Acid liquors resulting from the absorption of olefines in strong acids other than sulphuric acid, for example phosphoric acid or a sulphonic acid such as benzene sulphonic acid, may also be treated by the process of the invention.

The following examples serve to illustrate the application of the invention in different ways and to different acid liquors:—

Example 1

An acid liquor produced by the absorption of propylene in 90% sulphuric acid and subsequent dilution with water, and consisting essentially of the equivalent of one molecular proportion of isopropyl sulphuric acid with five molecular proportions of water, was fed into the top of a copper column 3 inches in diameter and 9 feet long, packed with pumice of 1/8" to 3/8" mesh. The column was provided with a dephlegmator, and with the appropriate feed inlets and a still base run off. The still base was heated to about 130° C. and the flow of cooling water through the dephlegmator was adjusted to provide a reflux ratio of 6:1. Isopropyl alcohol was obtained in the distillate in good yield, and an acid withdrawn from the still base which was considerably more concentrated than that obtained when a batch hydrolysis of the usual kind is carried out.

Example 2

An absorption liquor produced by passing ethylene through 80% sulphuric acid until about 0.67 molecule of ethylene had been absorbed for each molecule of acid was diluted with about its own weight of water and fed into the apparatus described in Example 1 at a point half-way down the column, the reflux ratio being 4.2 and the temperature in the still base 125° C. The distillate contained ethyl alcohol in high yield and regenerated acid was withdrawn from the still base.

What we claim and desire to secure by Letters Patent is:—

1. Process for the manufacture of hydration products of olefines by absorbing olefines in acids and hydrolyzing the products, which comprises feeding the acid absorption liquor and the water required for the hydrolysis into a column at at least one point substantially above the lower end of the column, indirectly heating the contents of the column at its lower end, removing volatile hydrolysis products and water vapor by distillation at the upper end of the column, condensing a considerable proportion of the vapors, returning the condensate to the column, and removing acid from the lower end of the column.

2. Process for the manufacture of hydration products of olefines by absorbing olefines in acids and hydrolyzing the products, which comprises feeding the acid absorption liquor and the water required for the hydrolysis into a column at at least one point in the upper half of the column, indirectly heating the contents of the column at its lower end, removing volatile hydrolysis products and water vapor by distillation at the upper end of the column, condensing a considerable proportion of the vapors, returning the condensate to the column, and removing acid from the lower end of the column.

3. Process for the manufacture of hydration products of olefines by absorbing olefines in acids and hydrolyzing the products, which comprises feeding the acid absorption liquor and the water required for the hydrolysis into a column at at least one point in the upper half of the column, indirectly heating the contents of the column at its lower end, removing volatile hydrolysis products and water vapor by distillation at the upper end of the column, condensing a proportion of the order of 80% of the vapors, returning the condensate to the column, and removing acid from the lower end of the column.

4. Process for the manufacture of ethanol by absorbing ethylene in sulphuric acid and hydrolyzing the product, which comprises feeding the acid absorption liquor and the water required for the hydrolysis into a column at at least one point substantially above the lower end of the column, indirectly heating the contents of the column at its lower end, removing ethanol and water vapor by distillation at the upper end of the column, condensing a considerable proportion of the vapors, returning the condensate to the column, and removing acid from the lower end of the column.

5. Process for the manufacture of isopropanol by absorbing propylene in sulphuric acid and hydrolyzing the product, which comprises feeding the acid absorption liquor and the water required for the hydrolysis into a column at at least one point substantially above the lower end of the column, indirectly heating the contents of the column at its lower end, removing isopropanol and water vapor by distillation at the upper end of the column, condensing a considerable proportion of the vapors, returning the condensate to the column, and removing acid from the lower end of the column.

6. Process for the manufacture of ethanol by absorbing ethylene in sulphuric acid and hydrolyzing the product, which comprises feeding the acid absorption liquor and the water required for the hydrolysis into a column at at least one point in the upper half of the column, indirectly heating the contents of the column at its lower end, removing ethanol and water vapor by distillation at the upper end of the column, condensing a proportion of the order of 80% of the vapors, returning the condensate to the column, and removing acid from the lower end of the column.

7. Process for the manufacture of isopropanol by absorbing propylene in sulphuric acid and hydrolyzing the product, which comprises feeding the acid absorption liquor and the water required for the hydrolysis into a column at at least one point in the upper half of the column, indirectly heating the contents of the column at its lower end, removing isopropanol and water vapor by distillation at the upper end of the column, condensing a proportion of the order of 80% of the vapors, returning the condensate to the column, and removing acid from the lower end of the column.

WALTER HENRY GROOMBRIDGE.
REGINALD JOHN PEEK.